March 26, 1935.   G. W. MEIER   1,995,546
METHOD OF WELDING
Filed Dec. 12, 1931

INVENTOR
Gustav W. Meier
BY Harry Bowen
ATTORNEY

Patented Mar. 26, 1935

1,995,546

UNITED STATES PATENT OFFICE 1,995,546

METHOD OF WELDING

Gustav W. Meier, Woodhaven, N. Y.

Application December 12, 1931, Serial No. 580,536

2 Claims. (Cl. 219—10)

The invention is a method of welding by which plates such as used in tank and ship construction may be joined by welding the edges with the use of a buttstrap having beveled edges and a V rib in which the rib is placed between the abutting square edges of the plates, making it possible to weld without rivet holes thru the plates and without beveling the edges of the plates.

One object of the invention is to provide a method of welding plates by which the use of rivets thru the plates may be eliminated.

Another object of the invention is to provide a method of welding in which it is not necessary to bevel the edges of the plates.

Another object of the invention is to provide an automatic method of welding the edges of plates together with a buttstrap in which the buttstrap is made of welding material and shaped to flow into the weld fill as the electrode is applied.

A further object of the invention is to provide an improved method of welding which may be used in any type of plate construction.

And a still further object of the invention is to provide an improved method of welding plates which permits of a more simple, efficient, and economical construction.

With these ends in view the invention embodies the use of a buttstrap with beveled edges and a V shaped rib for welding the edges of plates with abutting square edges in which the buttstrap is placed against one side of the plates with the V rib between the edges of the plates and the welding electrode applied to the rib to cause the same to flow to form the weld fill, or to a weld filling material to fill the space between the edges of the plates and V rib and also between the beveled edges of the buttstrap and plates.

Other features and advantages of the invention will appear from the following description taken in connection with the drawing, wherein:

Figure 12 is a view showing the weld completed and the lower edge of the first plate strake welded to the bottom of a tank or the like.

Figure 1:
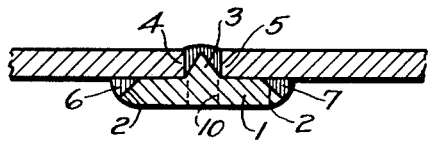
Figure 1 is a view showing a typical weld formed by this improved method.

In the drawing the method of forming the weld is shown as it would appear in which numeral 1 indicates a typical buttstrap, numeral 2 the beveled edges, and numeral 3 the V rib.

Figure 9:
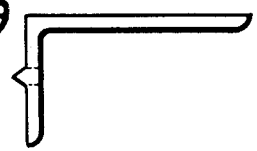
Figure 9 is a view showing a standard structural shape with a V rib formed on one of the flat surfaces thereof.
Figure 11:
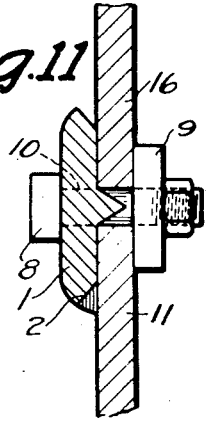
Figure 11 is a view showing the clamp removed and the next plate strake inserted and held by bolts thru the buttstrap while the welding is completed.

It will be understood that the buttstrap may be of any shape or design and also that the V rib may be formed on an angle iron as shown in Figure 9 or on a structural shape of any type or description. With the design shown in Figure 1 the plates to be welded are provided wtih square ends 4 and 5 and the buttstrap 1 is placed against the sides of the plates with the V rib 3 between the edges of the plates, and the space between the beveled edges 2 and the surfaces of the plates, and also the space between the edges of the plates filled with weld material as indicated by the numerals 6 and 7 respectively. During the welding process the buttstrap and plates are held together by bolts 8 and washers 9 as shown in Figure 11 and when the welding is completed the bolts and washers are removed and the holes filled with welding material. It will be noted that with this method it is not necessary to punch or drill holes in the plates or bevel the edges of the plates, as the holes for the bolts which hold the buttstrap and plates together are made in the buttstrap as indicated by the numeral 10, and the beveled surfaces required for welding are provided on the rib 3. Heretofore it has been necessary to machine a beveled surface on the edges of the plates, which is a very expensive operation, and the beveled surfaces held in abutting position against a plate by rivets thru the plates while welding, so that providing the beveled surfaces on the rib of the buttstrap makes it possible to weld the plates with the square edges and eliminates a very difficult welding problem. The rib 3 may be made as shown in Figures 3 to 6 or of any other shape, design, or arrangement.

Figure 10:
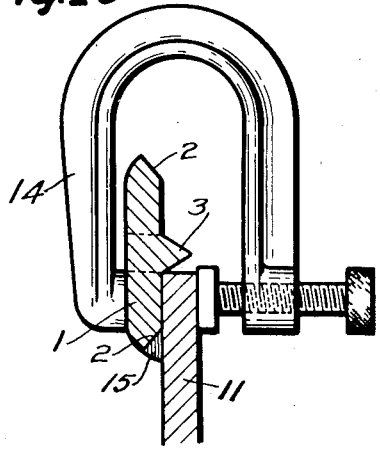
Figure 10 is a view showing a method of clamping the buttstrap to the upper edge of a plate strake for holding the buttstrap as the lower edge is tack welded to the plate.
Figure 12:
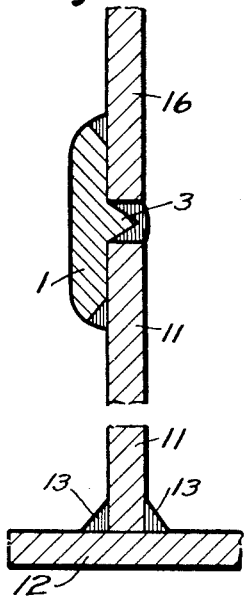
Figure 13:
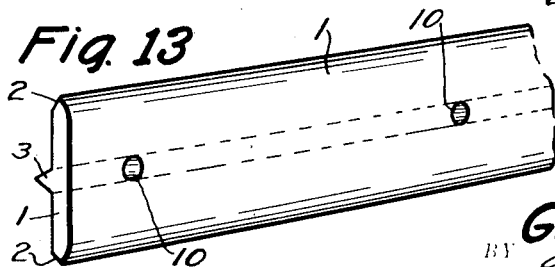
Figure 13 is a detail showing a portion of a typical buttstrap.

In welding vertically positioned plates the first plate strake 11 may be welded to the bottom 12 at the points 13, as shown in Figure 12, and a buttstrap 1 held in position upon the upper edge of the plate 11 by a clamp 14 as shown in Figure 10, or by any other means, and the lower edge of the buttstrap tack welded as shown at 15. The clamp may then be removed and the next plate strake 16 positioned as shown in Figure 11 and held in place by bolts 8 and washers 9 as shown, while the upper edge of the buttstrap is tack welded and the space between the plates welded. The bolts and washers are then removed and the bolt holes filled as hereinbefore described, thereby forming a joint as shown in Figure 12.

Figure 7:
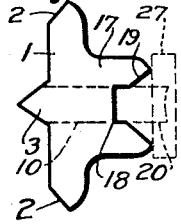
Figure 7 is a view showing a buttstrap with beveled edges at the back between which a reinforcing plate or strut may be welded.
Figure 8:
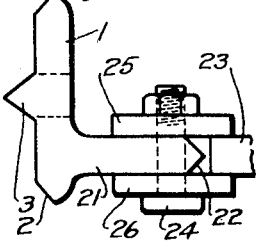
Figure 8 is a view showing a buttstrap with a plate at the back having beveled edges to which another plate may be welded.

The buttstrap 1 shown in Figure 7 is provided with a backing 17 having a groove 18 therein with beveled edges 19 so that a plate as indicated by the dotted lines 20, may be held therein by welding between the edges 19 and the plate. It will be understood that a plate or shape of any type or design may bje welded in the groove 18 and the groove may be located at any point on the buttstrap. In the design shown in Figure 8 the buttstrap 1 is provided with a flange or web 21 which may be of any shape or design and located at any point on the buttstrap. In the design shown the outer edge of the flange 21 is provided with beveled surfaces 22 and another member 23, which may also be of any shape or design, may be held to the flange 21 by bolts 24 and washers 25 and 26 while it is being welded thereto, and after it is welded in place the bolts and washers may be removed. It will be understood that the member 23 may be omitted and the flange 21 extended to compensate therefor if desired.

As hereinbefore specified the buttstrap 1 may be of any shape or design and may be made of any standard or other structural shape by placing a V rib on a flat surface thereof as shown in Figure 9. In all designs the buttstrap is provided with bolt holes 10 thru the rib thru which bolts may be placed for holding the buttstrap and plates together, and where the shape of the buttstrap is uneven, as shown in Figure 7, washers, as indicated by the dotted lines 27, may be used under the bolt heads, or the bolt heads may be made sufficiently large or of any shape.

Figure 2:
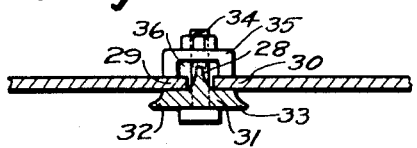
Figure 2 is a view showing a buttstrap as used in automatic welding in position before welding.
Figure 3:
Figure 3 is a view showing the profile of a buttstrap with a V rib.
Figure 4:
Figure 4 is a similar view showing a rib with concave sides.
Figure 5:
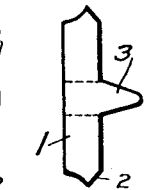
Figure 5 is also a similar view showing a rib with a rounded vertex.
Figure 6:
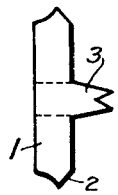
Figure 6 is also a similar view showing a rib with a V groove in the tip thereof.

The design shown in Figure 2 is particularly adapted for thin plates and it will be noted that the rib, which is indicated by the numeral 28, extends thru the plates 29 and 30, so that as an electrode is applied to the rib it will flow and form the weld fill between the plates thereby providing an automatic weld as additional welding material will not be required. The entire buttstrap, which in indicated by the numeral 31, is made of welding material and as the electrode is applied to the edges 32 and 33 they will flow against the surfaces of the plates and weld the edges of the buttstrap to the plates. The buttstrap 31 and the plates may be held by bolts 34 and washers 35, and the washers may be provided with recesses 36 to clear the rib and permit bearing upon the plates as shown. After the weld has been completed the bolts may be removed and the holes filled. It will be understood that the buttstrap 31 may be made in any of the designs shown for the buttstrap 1 or of any other design or shape.

It will be understood that other changes may be made without departing from the spirit of the invention. One of which changes may be in the use of this method of welding for any other purpose than for boilers, tanks, and ship construction as specified, another may be in the use of other means for clamping the buttstraps and plates together instead of the bolts and washers as shown, another may be in the use of additional welding surfaces on the buttstraps, and still another may be in the use of a plurality of buttstraps in combination, or in the use of other holding means in combination with the buttstraps.

The construction and general application will be readily understood from the foregoing description. In use the buttstraps will be provided as shown and used as described for welding the edges of plates together. The description is particularly adapted for horizontal welds, however the vertical joints will be made in the same manner, and preferably after the horizontal welds have been made. The same construction may be used for cylindrical tanks and after the side walls have been completed the erection of the roof may be started using the same procedure.

In using this specially designed V rib buttstrap the punching of holes in the plates is eliminated which eliminates laying out the holes in the drafting room and shop, and as the beveled edges are also eliminated all machine work is eliminated, so that the plates do not have to be shipped to the shop, and can be ordered to the exact size and shipped directly to the field. The V rib buttstraps will be manufactured in standard profiles with the holes drilled ready for use in the field. It will be noted that the V ribs will practically fill the space between the edges of the plates so that very little welding material will be required.

Having thus fully described the invention what I claim as new and desire to secure by Letters Patent, is:

1. A method of welding which consists in positioning edges of plates substantially in abutting relation, placing a buttstrap along said edges and on one side thereof, said buttstrap having a tongue extending into a space between the edges of the plates, bolting said buttstrap to the plates thru the space between the edges of the plates, welding said buttstrap to the plates, removing said bolts and closing the openings from which the bolts have been removed.

2. A method of welding as described in claim 1 in which the edges of the buttstrap are welded to the adjoining surfaces of the plates and a space between the edges of the plates is filled by the material of the tongue extending from the buttstrap.

GUSTAV W. MEIER.